US009911049B2

United States Patent
Suzuki et al.

(10) Patent No.: US 9,911,049 B2
(45) Date of Patent: Mar. 6, 2018

(54) LANE BOUNDARY LINE RECOGNITION APPARATUS

(71) Applicant: DENSO CORPORATION, Kariya, Aichi-pref. (JP)

(72) Inventors: Shunsuke Suzuki, Kariya (JP); Naoki Kawasaki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/977,296

(22) Filed: Dec. 21, 2015

(65) Prior Publication Data

US 2016/0188983 A1 Jun. 30, 2016

(30) Foreign Application Priority Data

Dec. 25, 2014 (JP) .................. 2014-262895

(51) Int. Cl.
*G06K 9/00* (2006.01)
*B60R 1/00* (2006.01)
*B60W 30/12* (2006.01)
*H04N 7/18* (2006.01)

(52) U.S. Cl.
CPC ........... *G06K 9/00798* (2013.01); *B60R 1/00* (2013.01); *B60W 30/12* (2013.01); *B60R 2300/804* (2013.01); *B60W 2420/42* (2013.01); *B60W 2550/14* (2013.01); *B60W 2900/00* (2013.01); *H04N 7/183* (2013.01)

(58) Field of Classification Search
None
See application file for complete search history.

(56) References Cited

U.S. PATENT DOCUMENTS

| 8,363,896 B2* | 1/2013 | Tamura | G06K 9/00798 382/103 |
| 8,611,609 B2* | 12/2013 | Oyama | G06K 9/00798 382/103 |
| 9,063,548 B1* | 6/2015 | Ferguson | G05D 1/0231 |

(Continued)

FOREIGN PATENT DOCUMENTS

| JP | H06-286539 A | 10/1994 |
| JP | H11-139225 A | 5/1999 |

(Continued)

*Primary Examiner* — Nancy Bitar
(74) *Attorney, Agent, or Firm* — Knobbe, Martens, Olson & Bear, LLP (57) ABSTRACT

A lane boundary line recognition apparatus acquires an image. Based on edge points extracted from the image, a lane boundary line candidate is extracted, and a lane boundary line probability thereof is calculated. A lane boundary line candidate of which the lane boundary line probability exceeds a threshold is recognized. As the threshold, a first threshold, larger than a second threshold in normal mode, is set when a first condition is met and also a second condition is met. The first condition is that a single lane boundary line is recognized on a roadside side of a lane in which the own vehicle is traveling, and a composite lane boundary line is recognized on a side opposite the roadside side. The second condition is that a state in which a lane boundary line cannot be recognized on at least the opposite side continues for a predetermined amount of time.

10 Claims, 5 Drawing Sheets

(56) References Cited

U.S. PATENT DOCUMENTS

| | | | |
|---|---|---|---|
| 2009/0080704 A1* | 3/2009 | Mori | G08G 1/167 382/104 |
| 2009/0201370 A1* | 8/2009 | Otsuka | G06K 9/3233 348/148 |
| 2010/0228437 A1* | 9/2010 | Hanzawa | B62D 1/28 701/41 |
| 2010/0259617 A1* | 10/2010 | Kawasaki | G06K 9/00798 348/148 |
| 2011/0200258 A1* | 8/2011 | Suzuki | G06K 9/00798 382/199 |
| 2012/0070088 A1* | 3/2012 | Yoshimi | G06K 9/00798 382/199 |
| 2012/0194677 A1* | 8/2012 | Suzuki | G06K 9/00798 348/148 |
| 2014/0118552 A1* | 5/2014 | Takahama | G06K 9/00798 348/148 |
| 2014/0379164 A1* | 12/2014 | Joh | G01C 21/30 701/1 |
| 2015/0169966 A1* | 6/2015 | Ishimaru | G08G 1/167 348/148 |
| 2015/0195500 A1* | 7/2015 | Usui | H04N 9/735 348/148 |

FOREIGN PATENT DOCUMENTS

| | | |
|---|---|---|
| JP | H11-175702 A | 7/1999 |
| JP | 2014-164492 A | 9/2014 |

\* cited by examiner

LANE BOUNDARY LINE RECOGNITION APPARATUS

CROSS-REFERENCE TO RELATED APPLICATION

This application is based on and claims the benefit of priority from Japanese Patent Application No. 2014-262895, filed Dec. 25, 2014. The entire disclosure of the above application is incorporated herein by reference.

BACKGROUND

Technical Field

The present disclosure relates to a lane boundary line recognition apparatus.

Related Art

A technology is known in which a road surface ahead of an own vehicle is imaged and an image is acquired. A lane boundary line (lane marking such as a white line) is recognized from the image (refer to JP-A-2014-164492). In this technology, the lane boundary line is recognized in the following manner. First, edge points are extracted from the image. Next, a lane boundary line candidate is extracted based on the edge points. Then, lane boundary line probability of the lane boundary line candidate is calculated. Finally, a lane boundary line candidate of which the lane boundary line probability exceeds a threshold is recognized as a lane boundary line.

Road configurations include a provisional (temporary) two-lane road. The provisional two-lane road refers to a road that is designed as a road having four or more lanes, but of which only two lanes are provisionally open. On a provisional two-lane road, a lane boundary line is difficult to recognize as a result of dirt on the road and the like. When lane boundary line recognition is performed on a provisional two-lane road, a lane boundary line in an opposing lane, poles, and the like may be erroneously recognized.

SUMMARY

It is thus desired to provide a lane boundary line recognition apparatus that is capable of solving the above-described problem.

An exemplary embodiment of the present disclosure provides a lane boundary line recognition apparatus that is mounted to an own vehicle. The lane boundary line recognition apparatus includes an image acquiring unit, an edge point extracting unit, a lane boundary line candidate extracting unit, a lane boundary line probability calculating unit, and a lane boundary line recognizing unit. The image acquiring unit images a road surface ahead of an own vehicle and acquires an image. The edge point extracting unit extracts edge points from the image. The lane boundary line candidate extracting unit extracts a lane boundary line candidate based on the edge points. The lane boundary line probability calculating unit calculates a lane boundary line probability of the lane boundary line candidate. The lane boundary line recognizing unit recognizes a lane boundary line candidate of which the lane boundary line probability exceeds a threshold as a lane boundary line.

In the exemplary embodiment, the lane boundary line recognition apparatus further includes a threshold setting unit that sets a first threshold as the threshold when a first condition is met and also a second condition is met. The first threshold is larger than a second threshold that is a predetermined threshold in normal mode. The first condition is a condition that a single lane boundary line is recognized on a roadside side of a lane in which the own vehicle is traveling, and a composite lane boundary line is recognized on a side opposite the roadside side. The second condition is a condition that a state in which a lane boundary line cannot be recognized on at least the opposite side continues for a predetermined amount of time.

According to the exemplary embodiment, the lane boundary line recognition apparatus sets the first threshold as the threshold, when the first condition is met and also the second condition is met.

The first threshold is larger than the second threshold that is a threshold in normal mode. Here, the first condition is easily met on a provisional two-lane road and not easily met on other roads.

Therefore, the lane boundary line recognition apparatus of the present disclosure increases the threshold when the road on which the own vehicle is traveling is a provisional two-lane road, and a state in which the lane boundary line on at least the opposite side cannot be recognized because of dirt or the like continues for a predetermined amount of time (when the second condition is met). As a result, for example, erroneous recognition of a lane boundary line in an opposing lane, poles, and the like as the lane boundary line of the lane in which the own vehicle is traveling can be suppressed.

DESCRIPTION OF THE EMBODIMENTS

Embodiments of the present disclosure will be described with reference to the drawings.

First Embodiment

1. Configuration

Figure 1:
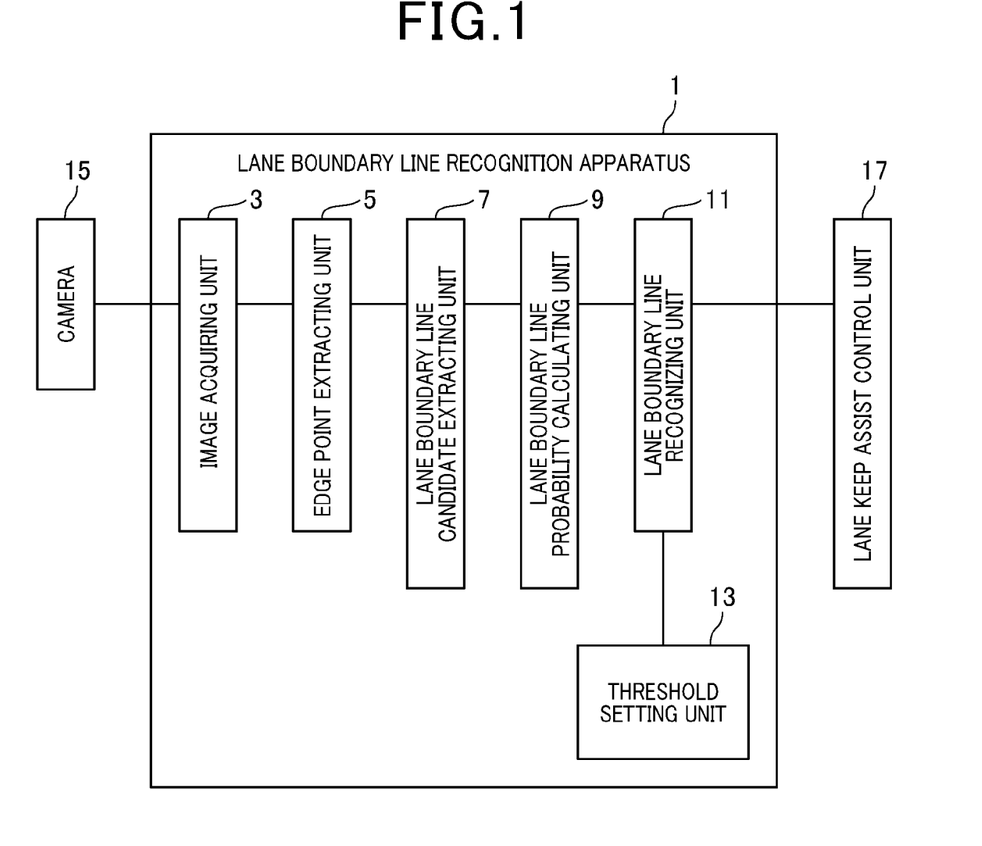
FIG. 1 is a block diagram of a configuration of a lane boundary line recognition apparatus according to a first embodiment.

A configuration of a lane boundary line recognition apparatus 1 will be described with reference to FIG. 1. The lane boundary line recognition apparatus 1 is an on-board apparatus that is mounted to a vehicle. The vehicle in which the lane boundary line recognition apparatus 1 is mounted is referred to, hereafter, as an own vehicle. The lane boundary line recognition apparatus 1 is a known computer that includes a central processing unit (CPU), a random access memory (RAM), a read-only memory (ROM), and the like. The lane boundary line recognition apparatus 1 performs processes, described hereafter, based on programs stored in the ROM.

The lane boundary line recognition apparatus 1 is functionally provided with an image acquiring unit 3, an edge point extracting unit 5, a lane boundary line candidate extracting unit 7, a lane boundary line probability calculating unit 9, a lane boundary line recognizing unit 11, and a threshold setting unit 13. The functions of the units will be described hereafter.

In addition to the lane boundary line recognition apparatus 1, the own vehicle includes a camera 15 and a lane keep assist control unit 17. The camera 15 images the road surface ahead of the own vehicle and generates an image. The generated image may be a color image or a monochromatic image. The camera 15 is, for example, a charge-coupled device (CCD) camera or an infrared camera.

The lane keep assist control unit 17 performs known lane keep assist using the lane boundary line recognized by the lane boundary line recognition apparatus 1. Lane keep assist refers to control performed to alert the driver with a warning buzzer or the like and support steering operations, when the own vehicle is about to deviate from the lane in which the own vehicle is traveling.

2. Lane Boundary Line Recognition Process

Figure 2:
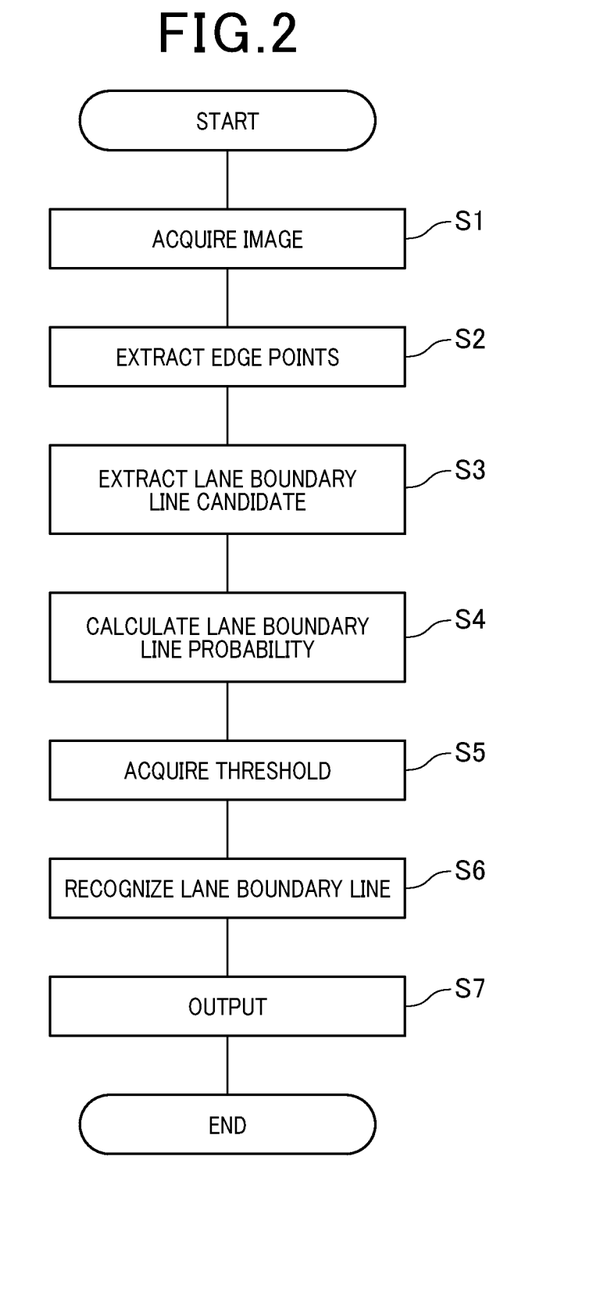
FIG. 2 is a flowchart of a lane boundary line recognition process performed by the lane boundary line recognition apparatus.

A lane boundary line recognition process repeatedly performed at a predetermined time interval by the lane boundary line recognition apparatus 1 will be described with reference to FIG. 2. At step S1 in FIG. 2, the image acquiring unit 3 acquires an image from the camera 15.

At step S2, the edge point extracting unit 5 extracts edge points from the image acquired at step S1. Specifically, first, the edge point extracting unit 5 calculates a derivative using a differential filter, for each horizontal line (all pixels having equal coordinate values in the vertical direction) in the image. That is, the edge point extracting unit 5 calculates the rate of change in luminance value between adjacent pixels for a plurality of pixels configuring the horizontal line.

Next, the edge point extracting unit 5 determines whether or not the calculated derivative is a predetermined upper limit value or higher. When determined that the derivative is the upper limit value or higher, the luminance value between adjacent pixels is considered to have significantly changed. Therefore, the edge point extracting unit 5 extracts the coordinate values of the pixel as an edge point and registers the edge point. The edge point extracting unit 5 performs the above-described process on all pixels in the image.

At step S3, the lane boundary line candidate extracting unit 7 extracts a lane boundary line candidate based on the edge points extracted at step S2. Extraction of the lane boundary line candidate can be performed by a known Hough transform process for line extraction or the like. A plurality of lane boundary line candidates may be detected in a single image frame.

At step S4, the lane boundary line probability calculating unit 9 calculates the lane boundary line probability (likelihood) of the lane boundary line candidate extracted at step S3. The lane boundary line probability can be calculated by a known method. For example, a lane boundary line probability value can be calculated for each of the following items: the number of edge points configuring the lane boundary line candidate, the shape of the lane boundary line candidate, the relative position of the lane boundary line candidate in relation to another object, and the like. A value obtained by multiplication of the calculated lane boundary line probability values can be set as the final lane boundary line probability.

At step S5, the lane boundary line recognizing unit 11 acquires a threshold that is currently set. The threshold is set by a threshold setting process, described hereafter.

At step S6, the lane boundary line recognizing unit 11 compares the lane boundary line probability calculated at step S4 with the threshold acquired at step S5, When a plurality of lane boundary line candidates are present, the lane boundary line recognizing unit 11 compares the lane boundary line probability of each lane boundary line candidate with the threshold. Then, the lane boundary line recognizing unit 11 recognizes a lane boundary line candidate of which the lane boundary line probability exceeds the threshold as a lane boundary line.

At step S7, the lane boundary line recognizing unit 11 outputs the lane boundary line recognized at step S6 to the lane keep assist control unit 17.

3. Threshold Setting Process

The threshold setting process repeatedly performed at a predetermined time interval by the lane boundary line recognition apparatus 1 (in particular, the threshold setting unit 13) will be described with reference to FIGS. 3 and 4.

Figure 3:
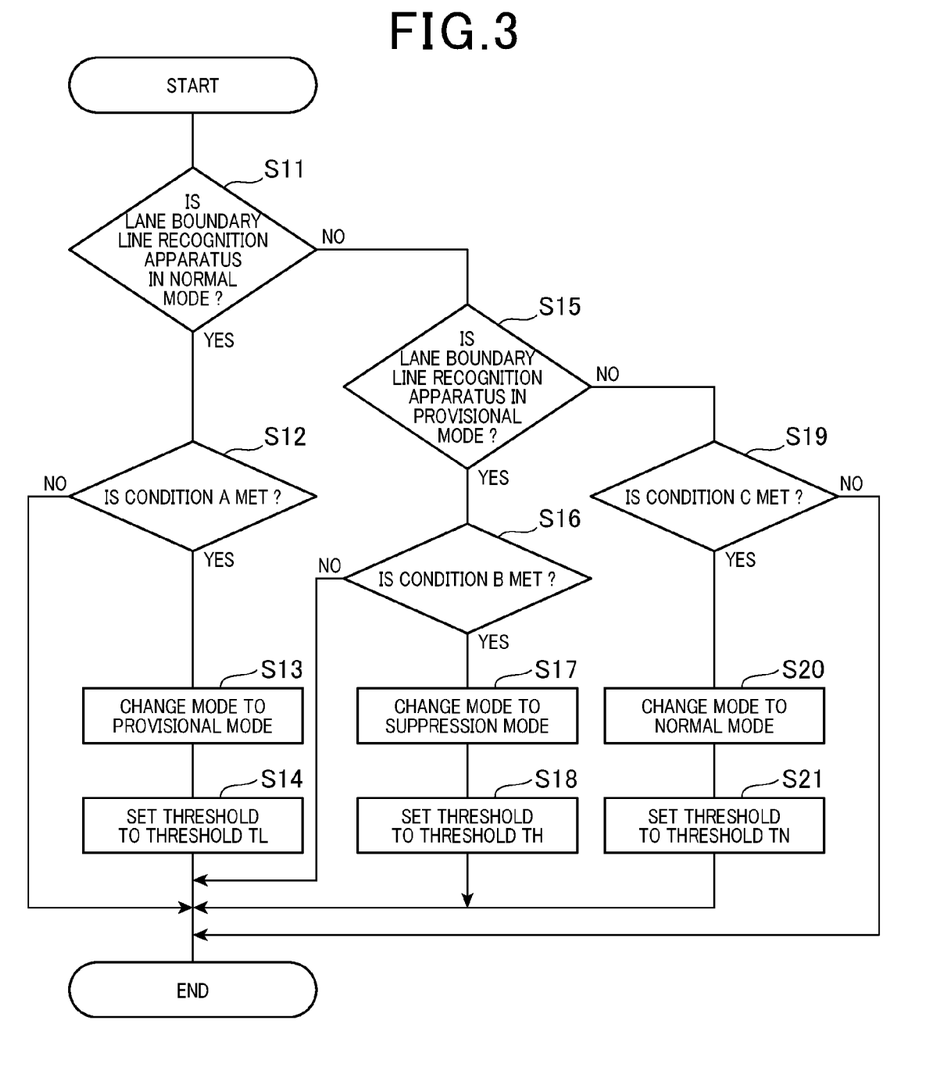
FIG. 3 is a flowchart of a threshold setting process performed by the lane boundary line recognition apparatus.

At step S11 in FIG. 3, the threshold setting unit 13 determines whether or not the current mode of the lane boundary line recognition apparatus 1 is normal mode. The lane boundary line recognition apparatus 1 is provided with three types of modes: normal mode, provisional mode, and suppression mode. The lane boundary line recognition apparatus 1 is in any one of the modes. The three modes differ in the value of the threshold. The relative magnitude of the thresholds among the three modes is TH>TN>TL, where TH is a threshold (first threshold; hereinafter referred to as "suppression mode threshold") in suppression mode, TN is a threshold (second threshold; hereinafter referred to as "normal mode threshold") in normal mode, and TL is a threshold (third threshold; hereinafter referred to as "provisional mode threshold") in provisional mode.

When the lane boundary line recognition apparatus 1 is in normal mode, the threshold setting unit 13 proceeds to step S12. When the lane boundary line recognition apparatus 1 is not in normal mode, the threshold setting unit 13 proceeds to step S15.

At step S12, the threshold setting unit 13 determines whether or not a first condition (hereinafter referred to as "condition A"), described hereafter, has been met after the previous execution of the threshold setting process. Condition A is that a single lane boundary line is recognized continuously for a predetermined amount of time or longer on the roadside side of the lane in which the own vehicle is traveling. In addition, a composite lane boundary line is recognized continuously for a predetermined amount of time or longer on the side opposite the roadside side.

Figure 4:
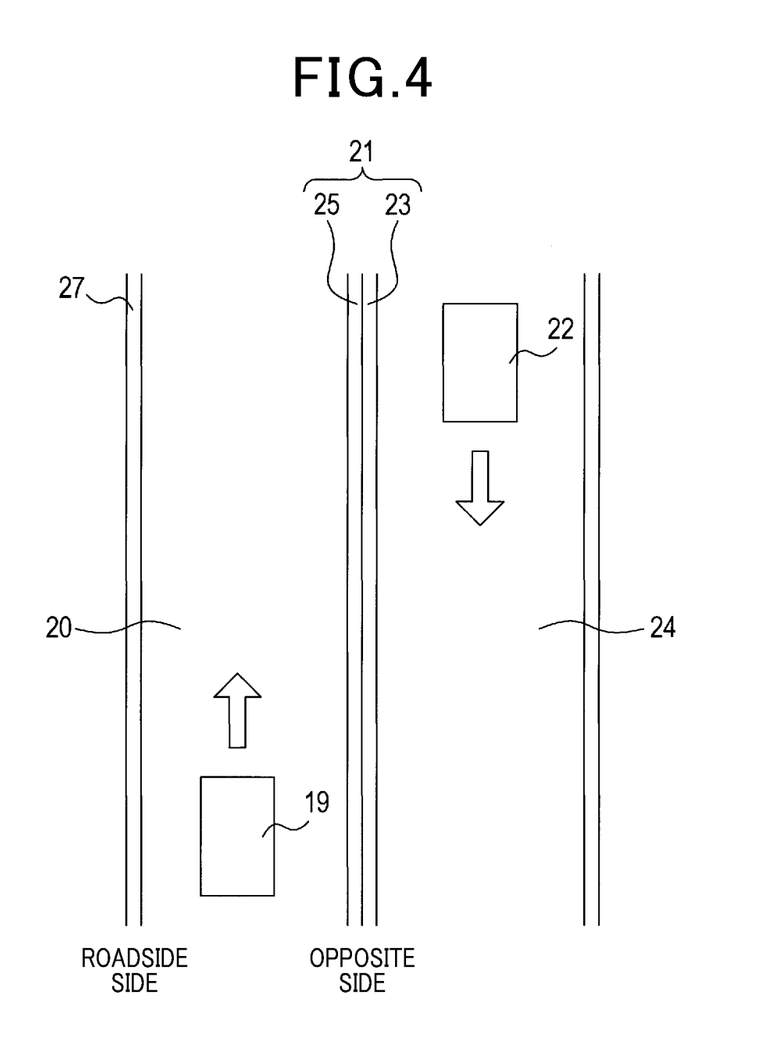
FIG. 4 is an explanatory diagram of a lane boundary line on a roadside side and a composite lane boundary line on the opposite side of the roadside side.

Here, as shown in FIG. 4, for example, in the case of left-hand traffic, the roadside side is the side on the left side of a lane 20 in which the own vehicle 19 is traveling. The opposite side refers to the side on the right side of the lane 20 in which the own vehicle 19 is traveling. In the case of a provisional two-lane road, the lane adjacent to the lane 20 in which the own vehicle 19 is traveling is an opposing lane 24 in which an opposing vehicle 22 travels. In addition, a composite lane boundary line refers to two or more lane boundary lines being present in the width direction of the road.

As shown in FIG. 4, two or more lane boundary lines 23 and 25 that configure the composite lane boundary line 21 may be joined without a gap therebetween. Alternatively, a gap may be present therebetween. In addition, the colors of the two or more lane boundary lines 23 and 25 that configure the composite lane boundary line may be the same or different (such as a white lane boundary line 23 and a yellow or orange lane boundary line 25). Each of the lane boundary lines 23 and 25 configuring the composite lane boundary line 21 may be a continuous line or a broken line.

The single lane boundary line in condition A refers to a single lane boundary line that cannot be divided into two or more lane boundary lines in the width direction of the road. FIG. 4 shows an example of a single lane boundary line 27. The single lane boundary line 27 may be a continuous line or a broken line.

When determined that condition A is met, the threshold setting unit 13 proceeds to step S13. When determined that condition A is not met, the threshold setting unit 13 ends the present process. At step S13, the threshold setting unit 13 changes the mode from normal mode to provisional mode. At step S14, the threshold setting unit 13 sets the provisional mode threshold TL as the threshold.

When determined NO at step S11, at step S15, the threshold setting unit 13 determines whether or not the current mode is provisional mode. When determined that the current mode is provisional mode, the threshold setting unit 13 proceeds to step S16. When determined that the current mode is not provisional mode, the threshold setting unit 13 proceeds to step S19.

At step S16, the threshold setting unit 13 determines whether or not a second condition (hereinafter referred to as "condition B"), described hereafter, has been met after the previous execution of the threshold setting process. Condition B is that a state in which the lane boundary line on at least the opposite side cannot be recognized continues for a predetermined amount of time.

When determined that condition B is met, the threshold setting unit 13 proceeds to step S17. When determined that condition B is not met, the threshold setting unit 13 ends the present process. When a state in which the lane boundary lines cannot be recognized on both the roadside side and the opposite side continues for a predetermined amount of time, condition B is met. In addition, when a state in which the lane boundary line is recognized on the roadside side but not on the opposite side continues for a predetermined amount of time, condition B is met.

At step S17, the threshold setting unit 13 changes the mode from provisional mode to suppression mode. At step S18, the threshold setting unit 13 sets the suppression mode threshold TH as the threshold.

When determined NO at step S15 (that is, when the current mode is suppression mode), at step S19, the threshold setting unit 13 determines whether or not a third condition (hereinafter referred to as "condition C"), described hereafter, has been met after the previous execution of the threshold setting process. Condition C is that the lane boundary lines on the roadside side and the opposite side are recognized for a predetermined amount of time or longer.

When determined that condition C is met, the threshold setting unit 13 proceeds to step S20. When determined that condition C is not met, the threshold setting unit 13 ends the present process. At step S20, the threshold setting unit 13 changes the mode from suppression mode to normal mode. At step S21, the threshold setting unit 13 sets the normal mode threshold TN as the threshold.

4. Effects (1A) The lane boundary line recognition apparatus 1 determines whether or not condition A is met in normal mode. When determined that condition A is met, the lane boundary line recognition apparatus 1 transitions to provisional mode. Condition A is a condition that is easily satisfied on a provisional two-lane road and is not easily satisfied on other roads. Therefore, when the road on which the own vehicle is traveling is a provisional two-lane road, the lane boundary line recognition apparatus 1 can transition to provisional mode.

In addition, after condition A has been met and the lane boundary line recognition apparatus 1 has transitioned to provisional mode, the lane boundary line recognition apparatus 1 determines whether or not condition B is met. When determined that condition B is met, the lane boundary line recognition apparatus 1 transitions to suppression mode and sets the suppression mode threshold TH as the threshold. The suppression mode threshold TH is larger than the normal mode threshold TN.

In other words, the lane boundary line recognition apparatus 1 increases the threshold when the road on which the own vehicle is traveling is a provisional two-lane road, and a state in which the lane boundary line on at least the opposite side cannot be recognized because of dirt or the like continues for a predetermined amount of time (when condition B is met). As a result, erroneous recognition of a lane boundary line in the opposing lane, poles, and the like as the lane boundary line of the lane in which the own vehicle is traveling can be suppressed.

(1B) The lane boundary line recognition apparatus 1 sets the provisional mode threshold TL as the threshold in provisional mode (the period from when condition A is met until condition B is met). The provisional mode threshold TL is less than the normal mode threshold TN. The lane boundary line recognition apparatus 1 thereby makes lane boundary line recognition easier. Therefore, whether or not the lane boundary line on the opposite side can be recognized can be more appropriately determined.

(1C) When condition C is met in suppression mode, the lane boundary line recognition apparatus 1 transitions to normal mode and returns the threshold to the threshold TN in normal mode. As a result, for example, after the own vehicle has passed through the provisional two-lane road, the lane boundary line recognition apparatus 1 can appropriately recognize a lane boundary line on a normal road.

Second Embodiment

1. Configuration

The configuration of the lane boundary line recognition apparatus 1 is similar to that according to the above-described first embodiment.

2. Lane Boundary Line Recognition Process

The lane boundary line recognition process performed by the lane boundary line recognition apparatus 1 is similar to that according to the above-described first embodiment.

3. Threshold Setting Process

A threshold setting process repeatedly performed at a predetermined time interval by the lane boundary line recognition apparatus 1 (in particular, the threshold setting unit 13) will be described with reference to FIG. 5.

Figure 5:
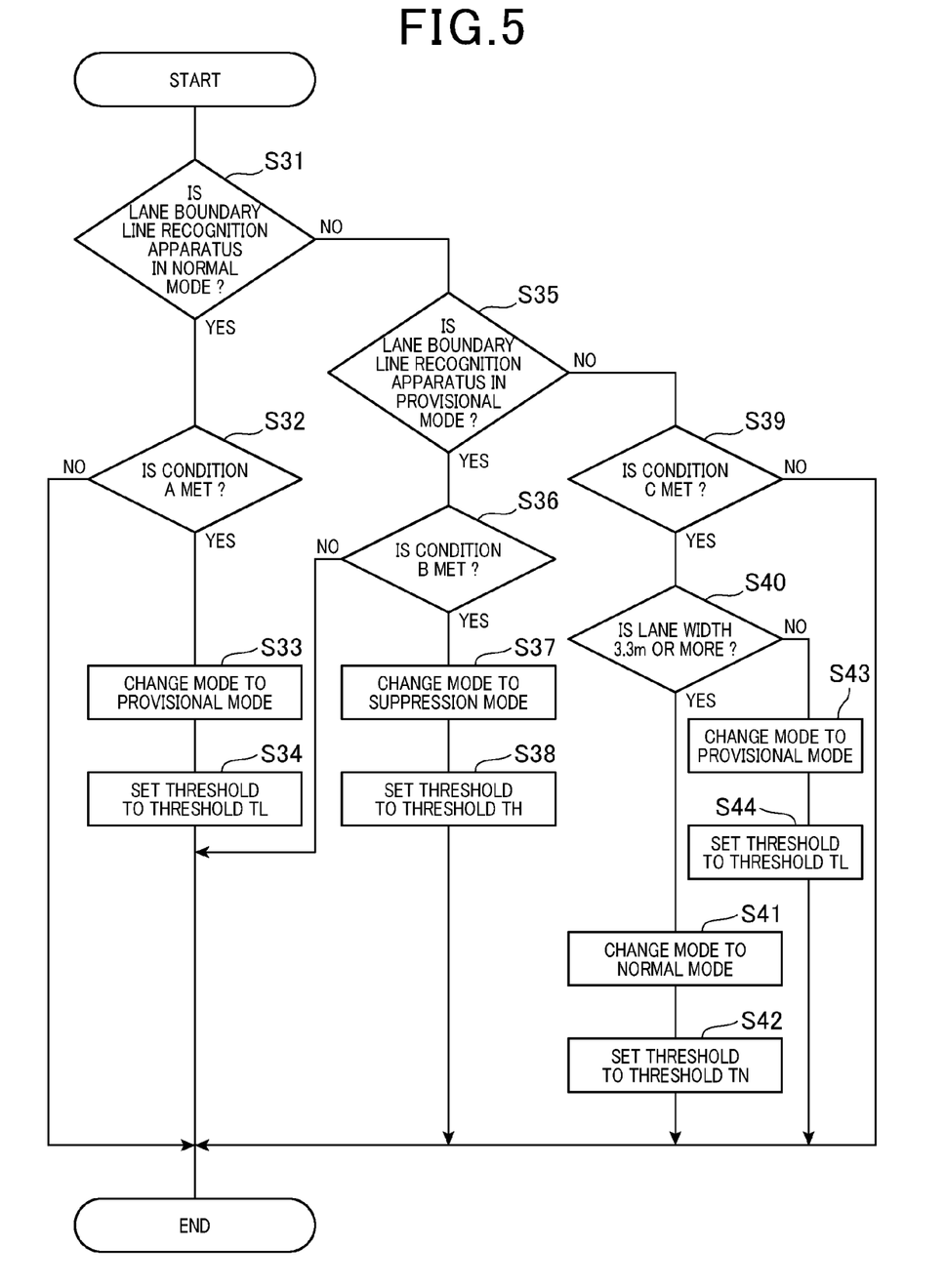
FIG. 5 is a flowchart of the threshold setting process performed by the lane boundary line recognition apparatus.

The processes at steps S31 to S39 in FIG. 5 are similar to the processes at steps S11 to S19 according to the above-described first embodiment.

When determined YES at step S39, at step S40, the threshold setting unit 13 determines whether or not the lane width is a lower limit width of 3.3 m or more. The lane width is the distance between the lane boundary line on the roadside side and the lane boundary line on the opposite side, which are determined to have been recognized at step S39. When determined that the lane width is 3.3 m or more, the threshold setting unit 13 proceeds to step S41. When determined that the lane width is less than 3.3 m, the threshold setting unit 13 proceeds to step S43. Here, 3.3 m is an example of a lower limit width in the present embodiment.

At step S41, the threshold setting unit 13 changes the mode from suppression mode to normal mode. At step S42, the threshold setting unit 13 sets the normal mode threshold TN as the threshold. At step S43, the threshold setting unit 13 changes the mode from suppression mode to provisional mode. At step S44, the threshold setting unit 13 sets the provisional mode threshold TL as the threshold.

4. Effects

According to the second embodiment, described in detail above, the following effects are achieved in addition to the effects (1A) to (1C) according to the first embodiment, described above.

(2A) When condition C is met, the lane boundary line recognition apparatus 1 determines whether or not the lane width of the recognized lane boundary lines is 3.3 m or more. When determined that the lane width is 3.3 m or more, the lane boundary line recognition apparatus 1 transitions to normal mode. When determined that the lane width is less than 3.3 m, the lane boundary line recognition apparatus 1 transitions to provisional mode.

Here, condition C being met and the lane width being 3.3 m or more correspond to a high probability that the provisional two-lane road has ended. In addition, condition C being met and the lane width being less than 3.3 m correspond to a high probability that the provisional two-lane road has not ended (for example, the own vehicle has entered, from a tunnel zone within the provisional two-lane road, a zone other than the tunnel zone within the provisional two-lane road).

Therefore, when the probability that the provisional two-lane road has ended is high, the lane boundary line recognition apparatus 1 transitions to normal mode. A lane boundary line on a road other than the provisional two-lane road can be appropriately recognized.

In addition, when the probability that the provisional two-lane road has not ended is high, the lane boundary line recognition apparatus 1 transitions to provisional mode. As a result, in a manner similar to (1B) described above, whether or not a lane boundary line on the opposite side can be recognized can be more accurately determined.

Other Embodiments

Embodiments of the present disclosure are described above. However, the preset disclosure is not limited to the above-described embodiment. Various embodiments are possible.

(1) According to the above-described first and second embodiments, in provisional mode, the range over which a lane boundary line on the opposite side is recognized may be restricted. For example, the range over which a lane boundary line is recognized on the opposite side may be set to a range that is within X m from the lane boundary line on the roadside side. The value of X can be set as appropriate within a range from 3 to 4. As a result, even when the provisional mode threshold TL is set as the threshold, erroneous recognition of a lane boundary line in the opposing lane, poles, and the like as the lane boundary line of the lane in which the own vehicle is traveling can be suppressed.

(2) According to the above-described first and second embodiments, in provisional mode, a composite lane boundary line can be made easier to recognize through features other than the magnitude of the threshold. For example, a unique color (such as yellow or orange) that appears in composite lane boundary lines can made easier to recognize in provisional mode, than in normal mode. As a method for achieving the foregoing, for example, edge point extraction sensitivity can be enhanced in an area having the unique color, within the image data. In addition, a method is also possible in which, when a color image is converted to a grayscale image, an area having the unique color is given weight, and the luminance value is increased in this area, compared to areas having other colors.

(3) According to the above-described first and second embodiments, when a predetermined condition is satisfied during provisional mode, the mode can be changed back to normal mode.

(4) According to the above-described first and second embodiments, condition A may be a condition that a single lane boundary line on the roadside side and a composite line on the opposite side are continuously recognized over a predetermined number of frames or more. In addition, condition B may be a condition that a state in which the lane boundary line cannot be recognized on at least the opposite side continues over a predetermined number of frames or more. In addition, condition C may be a condition that the lane boundary lines on the roadside side and the opposite side are continuously recognized over a predetermined number of frames or more.

(5) According to the above-described first and second embodiments, the number of lane boundary lines configuring the composite lane boundary line is not particularly limited. For example, the number of lane boundary lines may be 2, 3, 4, 5, 6, and so on. In addition, a pole or the like may be provided within the area of the composite lane boundary line.

(6) According to the above-described first and second embodiments, the value of the lower limit width is not limited to 3.3 m and can be set as appropriate.

(7) A function provided by a single constituent element according to the above-described embodiments may be dispersed among a plurality of constituent elements. Functions provided by a plurality of constituent elements may be integrated in a single constituent element. In addition, at least some of the configurations according to the above-described embodiments may be replaced with publicly known configurations that provide similar functions. Furthermore, at least some of the configurations according to the above-described embodiments may be omitted. Moreover, at least some of the configurations according to the above-described embodiments may, for example, be added to or substituted for a configuration according to another of the above-described embodiments. Any embodiment included in the technical concept specified only by the wordings of the scope of claims is an embodiment of the present disclosure.

(8) The present disclosure can also be actualized by various modes in addition to the above-described lane boundary line recognition apparatus, such as a system of which a constituent element is the lane boundary line recognition apparatus, a program enabling a computer to function as the lane boundary line recognition apparatus, a recording medium on which the program is recorded, and a lane boundary line recognition method.

What is claimed is:

1. A lane boundary line recognition apparatus that is mounted to an own vehicle, the lane boundary line recognition apparatus comprising:
   an image acquiring unit that images a road surface ahead of an own vehicle and acquires an image;
   an edge point extracting unit that extracts edge points from the image;
   a lane boundary line candidate extracting unit that extracts a lane boundary line candidate based on the edge points;
   a lane boundary line probability calculating unit that calculates a lane boundary line probability of the lane boundary line candidate;

a lane boundary line recognizing unit that recognizes a lane boundary line candidate of which the lane boundary line probability exceeds a threshold as a lane boundary line; and a threshold setting unit that sets a first threshold as the threshold when, after a first condition is met, a second condition is met, the first threshold being larger than a second threshold that is a predetermined threshold in normal mode, the first condition being a condition that a single lane boundary line is recognized on a roadside side of a lane in which the own vehicle is traveling, and a composite lane boundary line is recognized on a side opposite the roadside side, the second condition being a condition that a state in which a lane boundary line cannot be recognized on at least the opposite side continues for a predetermined amount of time.

2. The lane boundary line recognition apparatus according to claim 1, wherein the threshold setting unit sets a third threshold as the threshold during a period from when the first condition is met until the second condition is met, the third threshold being less than the second threshold.

3. The lane boundary line recognition apparatus according to claim 1, wherein the threshold setting unit sets the second threshold as the threshold, when a lane boundary line on the roadside side and a lane boundary line on the opposite side continue to be recognized for a predetermined amount of time in a state where the first threshold has been set.

4. The lane boundary line recognition apparatus according to claim 2, wherein the threshold setting unit sets the second threshold as the threshold, when a lane boundary line on the roadside side and a lane boundary line on the opposite side continue to be recognized for a predetermined amount of time in a state where the first threshold has been set.

5. The lane boundary line recognition apparatus according to claim 2, wherein the threshold setting unit sets the second threshold as the threshold, when i) a lane boundary line on the roadside side and a lane boundary line on the opposite side continue to be recognized for a predetermined amount of time in a state where the first threshold has been set, and ii) a width of the lane is a predetermined lower limit width or more, and the threshold setting unit sets the third threshold as the threshold, when iii) a lane boundary line on the roadside side and a lane boundary line on the opposite side continue to be recognized for a predetermined amount of time in a state where the first threshold has been set, and iv) the width of the lane is less than the predetermined lower limit.

6. A lane boundary line recognition method comprising:

imaging, by a lane boundary line recognition apparatus mounted to an own vehicle, a road surface ahead of an own vehicle and acquiring an image;

extracting, by the lane boundary line recognition apparatus, edge points from the image;

extracting, by the lane boundary line recognition apparatus, a lane boundary line candidate based on the edge points;

calculating, by the lane boundary line recognition apparatus, a lane boundary line probability of the lane boundary line candidate;

recognizing, by the lane boundary line recognition apparatus, a lane boundary line candidate of which the lane boundary line probability exceeds a threshold as a lane boundary line; and setting, by the lane boundary line recognition apparatus, a first threshold as the threshold when, after a first condition is met, a second condition is met, the first threshold being larger than a second threshold that is a predetermined threshold in normal mode, the first condition being a condition that a single lane boundary line is recognized on a roadside side of a lane in which the own vehicle is traveling, and a composite lane boundary line is recognized on a side opposite the roadside side, the second condition being a condition that a state in which a lane boundary line cannot be recognized on at least the opposite side continues for a predetermined amount of time.

7. The lane boundary line recognition method according to claim 6, wherein the setting step further sets a third threshold as the threshold during a period from when the first condition is met until the second condition is met, the third threshold being less than the second threshold.

8. The lane boundary line recognition method according to claim 6, wherein the setting step further sets the second threshold as the threshold, when a lane boundary line on the roadside side and a lane boundary line on the opposite side continue to be recognized for a predetermined amount of time in a state where the first threshold has been set.

9. The lane boundary line recognition method according to claim 7, wherein the setting step further sets the second threshold as the threshold, when a lane boundary line on the roadside side and a lane boundary line on the opposite side continue to be recognized for a predetermined amount of time in a state where the first threshold has been set.

10. The lane boundary line recognition method according to claim 7, wherein the setting step further sets the second threshold as the threshold, when i) a lane boundary line on the roadside side and a lane boundary line on the opposite side continue to be recognized for a predetermined amount of time in a state where the first threshold has been set, and ii) a width of the lane is a predetermined lower limit width or more, and the setting step further sets the third threshold as the threshold, when iii) a lane boundary line on the roadside side and a lane boundary line on the opposite side continue to be recognized for a predetermined amount of time in a state where the first threshold has been set, and iv) the width of the lane is less than the predetermined lower limit.

* * * * *